(12) United States Patent
Thompson et al.

(10) Patent No.: US 11,423,709 B2
(45) Date of Patent: Aug. 23, 2022

(54) METHODS AND SYSTEMS FOR IN-USE MONITOR PERFORMANCE

(71) Applicant: Ford Global Technologies, LLC, Dearborn, MI (US)

(72) Inventors: Scott Steadmon Thompson, Belleville, MI (US); Robert Roy Jentz, Westland, MI (US); Nicholas Herhusky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 16/503,389

(22) Filed: Jul. 3, 2019

(65) Prior Publication Data

US 2021/0005029 A1 Jan. 7, 2021

(51) Int. Cl.
*G07C 5/04* (2006.01)
*G01M 15/05* (2006.01)
*B60K 6/20* (2007.10)

(52) U.S. Cl.
CPC ............... *G07C 5/04* (2013.01); *G01M 15/05* (2013.01); *B60K 6/20* (2013.01); *B60Y 2200/92* (2013.01)

(58) Field of Classification Search
CPC ....... G07C 5/04; G07C 5/0808; G01M 15/05; B60K 6/20; B60Y 2200/92; B60R 16/0232
See application file for complete search history.

(56) References Cited

U.S. PATENT DOCUMENTS

| | | | |
|---|---|---|---|
| 8,577,522 B2 | 11/2013 | Walter et al. | |
| 9,805,522 B2 | 10/2017 | Schnurr et al. | |
| 2006/0224283 A1 | 10/2006 | Fussey et al. | |
| 2012/0072060 A1 | 3/2012 | Zettel et al. | |
| 2020/0005561 A1* | 1/2020 | Schroder | G07C 5/0808 |

* cited by examiner

*Primary Examiner* — Brian P Sweeney
(74) *Attorney, Agent, or Firm* — Vincent Mastrogiacomo; McCoy Russell LLP

(57) ABSTRACT

Methods and systems are provided for updating an in-use monitoring performance (IUMP) based on operation of an auxiliary device. In one example, a method may include using an engine model to estimate a duration in which a diagnostic routine is not completed due to operation of an auxiliary device driven by an engine and selectively updating the IUMP ratio based on a comparison of the duration to a minimum time duration needed for completion of the diagnostic routine.

20 Claims, 6 Drawing Sheets

METHODS AND SYSTEMS FOR IN-USE MONITOR PERFORMANCE

FIELD

The present description relates generally to methods and systems for updating an in-use monitoring performance (IUMP) based on operation of an auxiliary device.

BACKGROUND/SUMMARY

Passenger vehicles, light trucks, and heavy duty trucks may in some examples include an ability to support 110V-120V alternating current (AC) and 220V-240V AC electrical loads. As an example, such vehicles may support electrical loads (power take-off device) up to around 450 Watts, and in the future may support electrical loads from 2 KW-8 KW and potentially higher (e.g. 16 KW and greater). Systems for such vehicles may include designs for directly supporting such loads either while the vehicle is stationary, for example for use at a job site or for supplying electricity to home electrical loads, or while the vehicle is moving, for example to power a refrigeration unit. Further, mechanical energy from the engine may be directly used to operate an auxiliary device.

On-board diagnostic (OBD) systems may provide self-monitoring functionality incorporated into the engine control system in order to alert the vehicle driver/operator about potential issues with one or more on-board systems that can affect the performance of the vehicle. OBD may be carried out periodically or opportunistically during valid drive cycles. In order to quantify a frequency of monitoring such as for monitor compliance evaluation, an in-use monitor performance (IUMP) ratio may be defined as a ratio of a number of completed diagnostic routines and a number of valid drive cycles.

Various approaches are provided for accurately estimating an IUMP ratio during vehicle operation. In one example, as shown in US 20120072060, Zettel et al. teaches a method of monitoring an onboard diagnostic system for a plug-in hybrid electric vehicle which includes incrementing the denominator of a N/D ratio for the onboard diagnostic system only when a total time criteria, a vehicle speed criteria and an idle criteria are satisfied after an internal combustion engine of the vehicle has been fueled.

However, the inventors herein have recognized potential issues with such systems. As one example, operation of an auxiliary device may affect engine operation and may inhibit one or more diagnostic tests from running. In North America, IUMP rates may exceed a threshold (such as 52%), otherwise a vehicle model may be recalled, or warranty work may be specified for specific vehicles. Based on regulation, it is possible to not count drive cycles towards a monitor compliance evaluation if a diagnostic routine cannot be carried out due to operation of an auxiliary load. By excluding a drive cycle from a monitor compliance evaluation, the denominator of the IUMP ratio may not be updated. By excluding a drive cycle from IUMP ratio estimation every time an auxiliary device is operating may lead to a considerably lower number of valid drive cycles (counted towards IUMP denominator) which may not be desired based on regulations.

In one example, the issues described above may be addressed by a method for a vehicle comprising: using an engine model to estimate a duration in which a diagnostic routine is not completed due to operation of an auxiliary device driven by an engine, and in response to the duration being higher than a first threshold duration, excluding a drive cycle from a monitor compliance evaluation. In this way, by accurately estimating an IUMP ratio based on operation of the auxiliary device, it is possible to improve vehicle performance and regulations compliance.

As an example, during a drive cycle, engine power may be used to operate an auxiliary device such as a cement mixer, a trash compactor, a harvester, a snow plough, a mobility device, etc. Due to operation of the auxiliary device, engine operating conditions may be modified and may not be able to support a diagnostic routine. For each diagnostic routine, a pre-calibration may be carried out to determine if the routine can be performed during operation of an auxiliary device. If the diagnostic routine is not affected by operation of the auxiliary device, the diagnostic routine may be carried out regardless of auxiliary device operation and the IUMP ratio is updated accordingly. If a diagnostic routine is not being carried out and an auxiliary device is being operated, a virtual engine model without auxiliary devices (VEMAD) may be run to determine if the operation of the auxiliary device responsible for the diagnostic routine not being carried out. A plurality of engine operating parameters some of which are affected due to the presence of an auxiliary load may be used as an input to the VEMAD model. During the drive cycle, the duration of time (T1) where the diagnostic routine is disabled due to the operation of the auxiliary device may be estimated from the VEMAD model and compared to a duration of time (TC) taken to complete the diagnostics test. If it is determined that T1 is greater than TC, it is inferred that the diagnostics test could have been carried out if the auxiliary device was not operating and the current drive cycle may be excluded from being counted as a valid drive cycle and the IUMP ratio is not updated. If it is determined that T1 is lower than TC, it is inferred that the diagnostics test could not have been carried out even if the auxiliary device was not operating and the current drive cycle may be counted as a valid drive cycle and a denominator of the IUMP ratio may be incremented.

In this way, by determining drive cycles where the diagnostics test could be carried out in the absence of the auxiliary device via a VEMAD model, valid drive cycle estimation may be improved and an accuracy of determination of the IUMP ratio may be improved. By incrementing a denominator of the IUMP ratio during conditions when the diagnostics test could not have been carried out even if the auxiliary device was not operating, inaccurate lowering of the denominator may be averted. The technical effect of carrying out the diagnostic routine if an operation of the auxiliary device is known to not affect the routine is that the number of completed diagnostic routine may be improved. Overall, by accurately updating an IUMP ratio based on operation of the auxiliary device and engine operating conditions, vehicle performance may be improved and regulations compliance may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
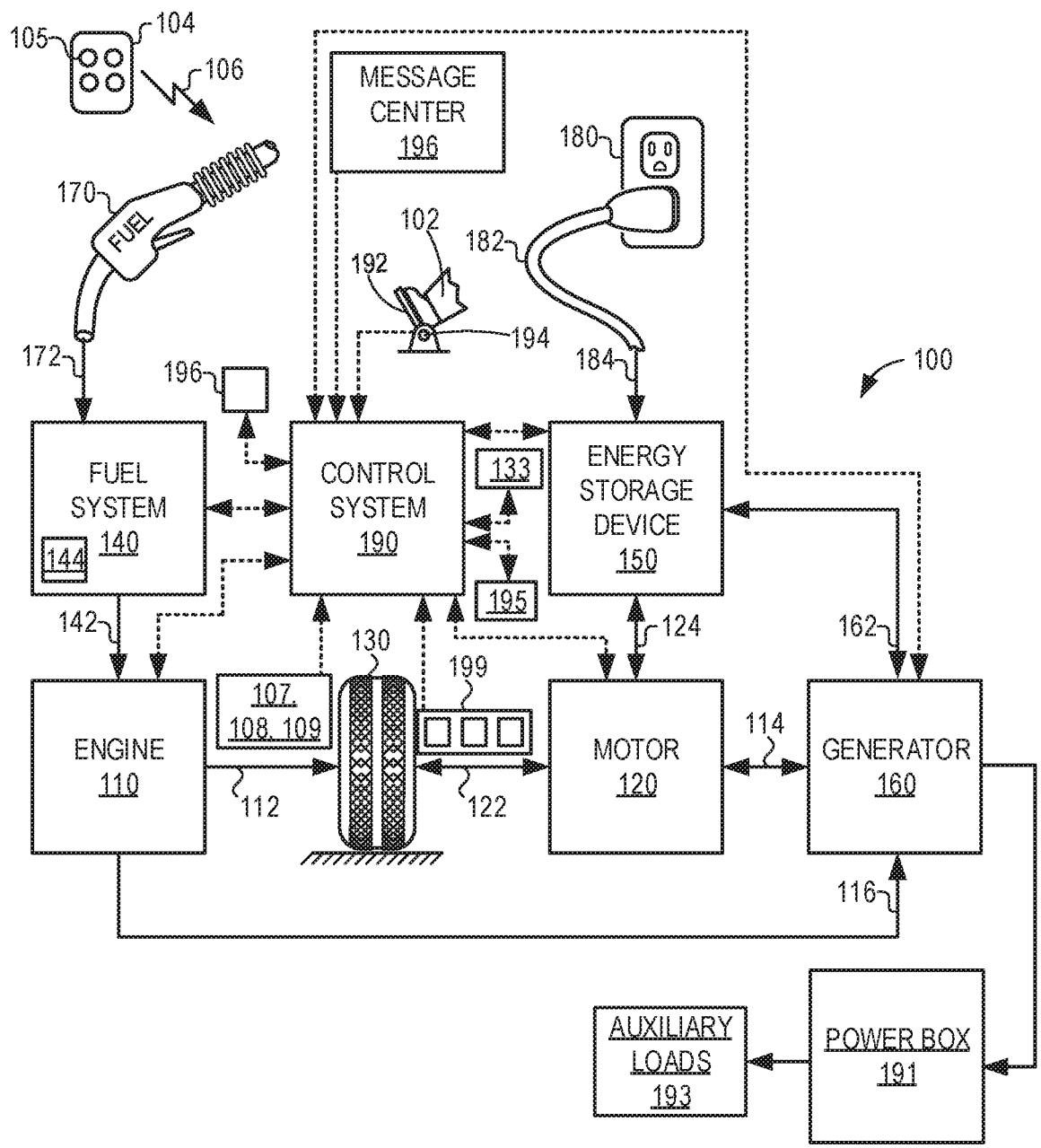
FIG. 1 schematically shows an example vehicle propulsion system.
Figure 2:
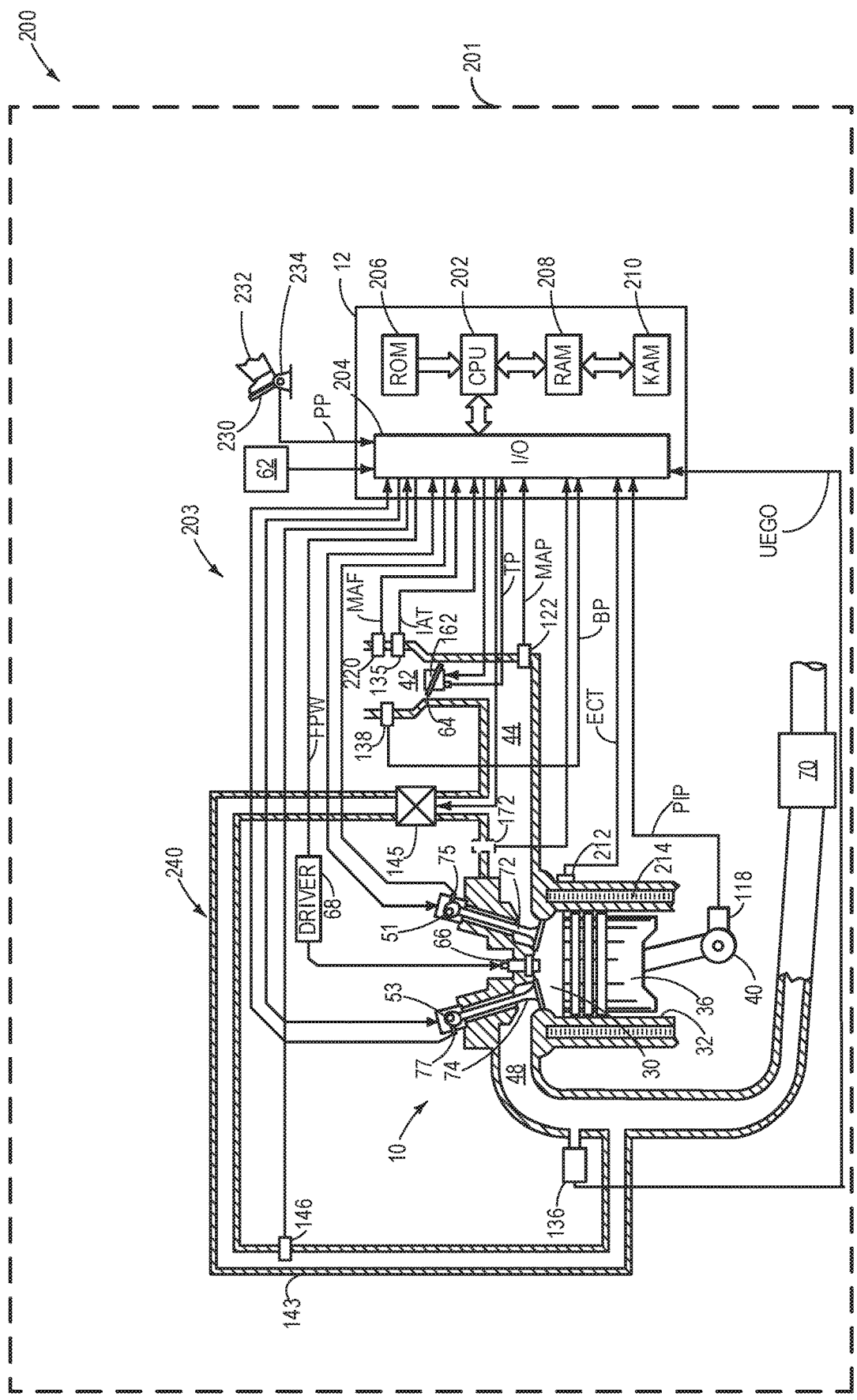
FIG. 2 shows an example engine system of the vehicle propulsion system.

The following description relates to systems and methods for updating an in-use monitor performance (IUMP) ratio diagnostic routine completion during auxiliary device operation. Vehicle systems that include an onboard power box that may receive power from engine operation and supply power to an auxiliary device, such as the vehicle system depicted at FIG. 1. An example engine system of the vehicle system of FIG. 1 is shown in FIG. 2. An engine controller may be configured to perform control routine, such as example routine of FIG. 3 to update an in-use monitor performance (IUMP) ratio based on diagnostic routine completion during auxiliary device operation. A virtual engine model without auxiliary devices (VEMAD) may be operated parallel to the controller, as shown in the example routine of FIG. 4, to update the IUMP ratio during operation of the auxiliary device. An example VEMAD model is elaborated with reference to FIG. 5. An example of updating of the IUMP ratio based on diagnostic routine completion during auxiliary device operation is shown in FIG. 6.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Vehicle propulsion system 100 may include a power box 191 which may receive power from generator 160. Power box 191 may include one or more alternating current (AC) and/or direct current (DC) power outlets for performing tasks including but not limited to powering power tools at work sites, powering lighting, powering outdoor speakers, powering water pumps, supplying power in situations including emergency power outage, powering tailgating activities, powering RV camping activities, etc. In other words, the AC and/or DC power outlets of power box 191 may be used to power auxiliary electrical loads 193 (power take-off devices), for example loads external to the vehicle. The power outlets may be external to a cabin of the vehicle (e.g. bed of truck) and/or internal to the cabin of the vehicle.

Generator 160 may comprise an onboard full sine wave inverter. For providing power via power box 191, generator 160 may receive energy via the energy storage device 150 in some examples, where DC power is converted via the generator 160 to AC power for powering power box 191 under situations where AC power is desired. Additionally or alternatively, the engine 110 may be activated to combust air and fuel in order to generate AC power via generator 160 for powering power box 191. The vehicle operator 102 may utilize vehicle instrument panel 196 (such as a human machine interface), which may include input portions for receiving operator input, for controlling power box 191. In an alternate embodiment, in addition to generator 160, an additional generator coupled to the engine may be used to power the power box 191.

Discussed herein, to power auxiliary electrical loads, the vehicle operator 102 may select a mode of operation via the vehicle instrument panel termed "power to the box" or PttB mode. In the PttB mode, power from the generator 160 may be utilized to operate an off-board auxiliary load 193. For example, the vehicle operator may select PttB mode via the vehicle instrument panel, and may further select an engine speed (revolutions per minute or RPM) that the engine may run at for powering the power box 191.

During operation of the auxiliary load 193 (also referred herein as auxiliary device), engine operating conditions may be altered to supply power to the generator while propelling the vehicle. In one example, an auxiliary device may be directly connected to the engine and may receive mechanical energy from the engine. As an example, the engine idling speed may be increased to support operation of a hydraulic pump connected to the generator to the engine. As an example, an auxiliary device may have a friction torque which may exist whenever the device is connected to the engine system even though the device may be disabled.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include sensors dedicated to indicating the occupancy-state of the vehicle, for example seat load cells 107, door sensing technology 108, and onboard cameras 109. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. In some examples, vehicle instrument panel 196 may include a speaker or speakers for additionally or alternatively conveying audible messages to an operator. The vehicle instrument panel 196 may also include various input portions for receiving an operator input, such as buttons, touch screens, voice input/recognition (which may include a microphone), etc.

In some examples, vehicle system 100 may include lasers, radar, sonar, and/or acoustic sensors 133, which may enable vehicle location, traffic information, etc., to be collected via the vehicle. In one example, discussed in further detail below, one or more of sensors 133 may be used to infer a situation where the vehicle is in an environment of reduced air exchange (as compared to, for example, a situation where the vehicle is traveling on an open road or is parked outside).

FIG. 2 is a schematic diagram showing a vehicle system 200 comprising a vehicle 201 and an engine system 203. The vehicle system 201 may be the vehicle system 100 of FIG. 1 and the engine system 203 may be the engine 110 of FIG.

1. FIG. 2 shows one cylinder of a multi-cylinder engine 10 in the engine system 203. The engine 10 may be controlled at least partially by a control system including a controller 12 and by input from a vehicle operator 232 via an input device 230. In this example, the input device 230 includes an accelerator pedal and a pedal position sensor 234 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 135 and the barometric pressure (BP) sensor 138. The IAT sensor 135 estimates intake air temperature to be used in engine operations and provides a signal to the controller 12. Similarly, the BP sensor 138 estimates the ambient pressure for engine operations and provides a signal to the controller 12. The intake passage 42 may further include a mass air flow sensor 220 and a manifold air pressure sensor 122 for providing respective signals MAF and MAP to the controller 12.

An exhaust gas sensor 136 is shown coupled to the exhaust passage 48 upstream of an emission control device 70. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 136. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 240 may route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 240 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 2 as a microcomputer, including a microprocessor unit 202, input/output ports 204, an electronic storage medium for executable programs and calibration values shown as read only memory chip 206 in this particular example, random access memory 208, keep alive memory 210, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 220; engine coolant temperature (ECT) from a temperature sensor 212 coupled to a cooling sleeve 214; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque.

The storage medium read-only memory 206 can be programmed with computer readable data representing non-transitory instructions executable by the processor 202 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

The controller 12 receives signals from the various sensors of FIG. 2 and employs the various actuators of FIG. 2 to adjust engine operation based on the received signals and instructions stored on a memory of the controller 12.

If auxiliary loads (also referred herein as power take-off device) are coupled to a power box (such as power box 191 in FIG. 1) of the vehicle system and is powered by operating the engine, one or more engine operating parameters such as engine idling speed, throttle opening, fuel injection, spark timing, etc. may be adjusted to satisfy the energy demands of the auxiliary device. Based on recommendations of a regulatory authority, on-board diagnostic (OBD) is desired to be periodically or opportunistically carried out in order to alert the vehicle driver/operator about potential issues with one or more on-board systems that can affect the performance of the vehicle. In order to quantify a frequency of monitoring of engine systems such as for monitor compliance (with regulatory standards) evaluation, an in-use monitor performance (IUMP) ratio may be defined as a ratio of a number of completed monitoring events and a number of valid drive cycles. However, during operation of the auxiliary device, the altered engine operating conditions may no longer facilitate performance of one or more scheduled OBD which may affect estimation of the IUMP ratio.

If it is observed that a diagnostic routine is not being initiated/completed during operation of the auxiliary device, an engine model may be used to estimate a duration in which a diagnostic routine is not completed due to operation of an auxiliary device driven by an engine. In response to the duration being higher than a minimum duration of time for completion of the diagnostic routine, a numerator and a denominator of the IUMP ratio may not be updated at the end of the drive cycle when the diagnostic routine is not completed and the drive cycle. In response to the duration in which the diagnostic routine is not completed due to operation of the auxiliary device being lower than the minimum duration of time for completion of the diagnostic routine, the denominator of the IUMP ratio may be incremented by one. If during operation of the auxiliary device, the diagnostic routine is completed, each of the numerator and the denominator of the IUMP ratio may be incremented by one.

During operation of the auxiliary device, the engine model may estimate one or more virtual engine operating parameters corresponding to a hypothetical situation in the drive cycle without the operation of the auxiliary device. The one or more virtual engine operating parameters may include a virtual throttle position, a virtual manifold air pressure, a virtual engine load, a virtual exhaust pressure, a virtual exhaust temperature, a virtual intake camshaft position, a virtual exhaust camshaft position, a virtual number of active engine cylinders, a virtual engine brake torque, and a virtual spark timing. The inputs to the engine model may include the one or more virtual engine operating parameters and one or more current engine operating conditions altered during operation of the auxiliary device, the current engine operating conditions including a throttle position, a manifold air pressure, an engine load, exhaust pressure, exhaust temperature, intake camshaft position, exhaust camshaft position, a number of active engine cylinders, engine brake torque, and spark timing. The inputs to the engine model may further include one or more of auxiliary device requested engine torque and auxiliary device requested engine speed. The inputs to the engine model may also include one or more vehicle conditions not affected by the operation of the auxiliary device, the one or more vehicle conditions including a vehicle speed, an ambient temperature, a coolant temperature, a driver torque demand, a fuel level, a transmission range, a brake pedal state, an engine oil temperature, a transmission oil temperature, and an automatic gear shift position.

In this way, the system of FIGS. 1 and 2 enable a system for a vehicle comprising: a controller with computer readable instructions stored on non-transitory memory to: during a drive cycle when an external auxiliary device is powered by operation of an engine, in response to a diagnostic routine not being completed, estimating, via an engine model, a time duration where the diagnostic routine is not completed due to operation of the auxiliary device, comparing the time duration to a minimum duration for completion of the diagnostic routine, in response to the time duration being higher than the minimum duration, at an end of the drive cycle, not updating an in-use monitor performance (IUMP) ratio, and in response to the time duration being lower than the minimum duration, at the end of the drive cycle, increasing a denominator of the IUMP ratio without altering the numerator of the IUMP ratio. As an example, during a first drive cycle, a time duration where the diagnostic routine is not completed due to operation of the auxiliary device may be higher than the minimum duration for completion of the diagnostic routine and during a second drive cycle, a time duration where the diagnostic routine is not completed due to operation of the auxiliary device may be lower than the minimum duration for completion of the diagnostic routine. The first and the second drive cycle may be consecutive drive cycles or separated by other drive cycles in between.

Figure 3:
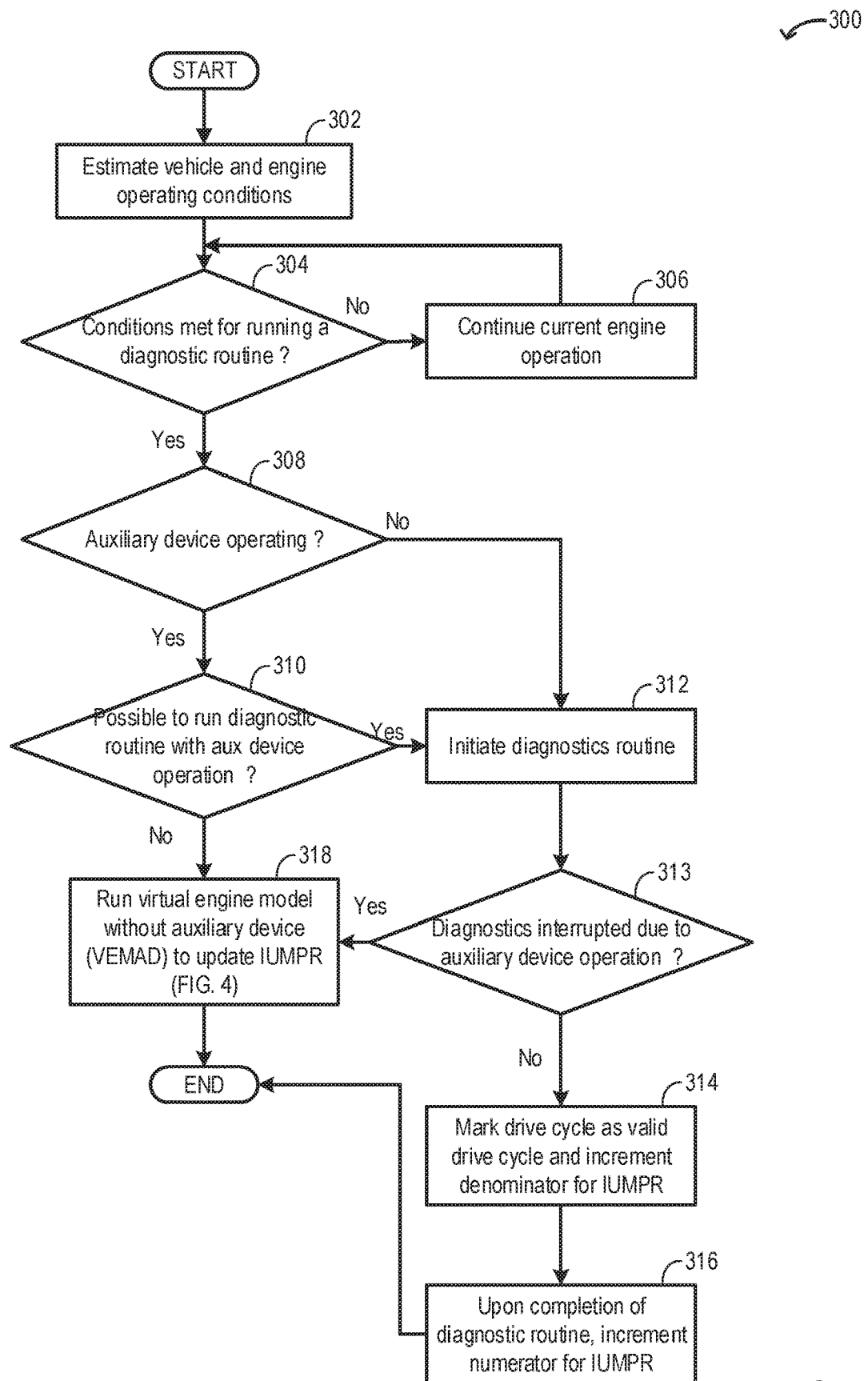
FIG. 3 shows a first flow chart illustrating an example method that can be implemented to update an in-use monitor performance (IUMP) ratio based on diagnostic routine completion during auxiliary device operation.

FIG. 3 shows an example method 300 for updating an in-use monitor performance (IUMP) ratio based on diagnostic routine completion during auxiliary device operation. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc. Also, operation of an on-board generation (such as generator 160 in FIG. 1) may be estimated.

At 304, the routine includes determining if conditions are met for running an on-board diagnostic routine (also referred herein as a monitoring event). The diagnostic routine may include health monitoring of a vehicle component which may involve actively actuating one or more actuators, receiving inputs from one or more sensors, processing the sensor inputs, and determining if the vehicle component is operating as desired. As an example, the vehicle component may include an engine valve such as an EGR valve, a sensor such as a MAP sensor, an emissions control device, etc. A diagnostic routine may be carried out in a valid drive cycle. A valid drive cycle may be defined as a drive cycle during which a diagnostic routine may be carried out without influence of external parameters such as operation of an auxiliary device. In one example, conditions for a valid drive cycle may include vehicle operation for over 600 seconds, vehicle operation at over 25 mph for at least 300 seconds, and a continuous engine idling period of at least 30 seconds.

Each diagnostic routine may include one or more entry conditions such as an engine speed range, a throttle position range, a mass air flow limit, an engine load limit, an engine temperature range, a minimum fuel level, a vehicle speed range, a transmission gear position, a deceleration fuel shut-off condition, and other vehicle and engine operating conditions. Each diagnostic routine may be carried out after a threshold duration of time has elapsed or a threshold distance has been traveled by the vehicle since the immediately previous run of that routine.

An example diagnostic routine may include an oxygen sensor test that can be carried out during a deceleration fuel shut off (DFSO) event. During the test, oxygen passing through the engine may be used to confirm the functional range of the sensor. A plurality of readings of the oxygen sensor are monitored during the DFSO event and compared to pre-calibrated values to confirm that the sensor is operating over its entire functional range. The oxygen sensor test may include further entry conditions such as a higher than threshold engine speed, a higher than threshold engine coolant temperature, and vehicle operation conditions that support a DFSO event.

If it is determined that conditions are not met for running an on-board diagnostic routine, at 306, current engine operations may be continued without initiation of a diagnostic routine, such as the engine may be maintained running with cylinders combusting fuel. If it is determined that conditions are met for one or more diagnostic tests to be carried out, at 308, the routine includes determining if an auxiliary device coupled to the engine is operating. An auxiliary device may include a cement mixer, a trash compactor, a harvester, a snow plough, a mobility device, etc. In one example, the auxiliary device may be coupled to a power box which may receive power from the engine via a generator. In another example, the auxiliary device may directly derive mechanical energy from the engine. The generator may be operated to convert engine torque to electrical energy that is supplied to the power box. The power box may include one or more alternating current (AC) and/or direct current (DC) power outlets for performing tasks including but not limited to powering an auxiliary device. The power box may be used for powering power tools at work sites, powering lighting, powering outdoor speakers, powering water pumps, supplying power in situations including power outage, powering tailgating activities, powering RV camping activities, etc. Therefore, by operating the generator, engine power may be used to operate external electrical loads via the power box. When the generator is operated to power auxiliary electrical loads, the vehicle operator may select a mode of operation via the vehicle instrument panel termed "power to the box" or PttB mode. In the PttB mode, power from the generator may be utilized to operate off-board electrical load(s).

Due to operation of the auxiliary device, one or more engine operating conditions may be modified. As an example, if an auxiliary device extracts engine power, the engine needs to produce a total of a driver demanded torque and an auxiliary device demanded torque. Due to the increased torque request, the throttle opening may be increased, engine speed may be increased, engine temperature may be increased, and/or operation of the vehicle in a deceleration fuel shut-off condition may be inhibited.

If it is determined that an auxiliary device is not operating and conditions are met for running a diagnostic routine, it may be inferred that engine operation is not being affected by auxiliary device operation. At 312, the controller may initiate the diagnostic routine by actuating one or more engine controllers. As an example, the above mentioned oxygen sensor test may be carried out when the auxiliary device is not operating and conditions are met (such as a DFSO event) for the test. Since the auxiliary device is not functional, the engine may shut down when conditions are met for the DFSO event and enable the test to continue.

If it is determined that an auxiliary device is operating, at 310, the routine includes determining if it is possible to run a diagnostic routine during operation of the auxiliary device. In one example, for certain diagnostic routines, the changes in engine operating conditions may not adversely affect the outcome of the diagnostic routine. In another example, even after the engine operating conditions change due to the auxiliary device operation, the conditions remain suitable for running a diagnostic routine. The controller may pre-calibrate which diagnostic routines may be carried out without their results being affected by auxiliary device operation.

As an example a diagnostic routine that may be unaffected by an auxiliary device is a voltage range check on engine sensor, such as a manifold air pressure (MAP sensor), a manifold air flow (MAF) sensor, an engine coolant temperature (ECT) sensor, an intake air temperature (IAT) sensor, and other such sensors. Therefore, one or more of these diagnostic routines may be carried out during operation of the auxiliary device.

The in-use monitor performance (IUMP) ratio may be used for monitor compliance evaluation and by carrying out diagnostic routines during operation of the auxiliary device, it is possible to complete diagnostic routines more frequently, and maintaining a desired IUMP ratio.

However, due to the changed engine operating conditions caused by operation of the auxiliary device, it may not be possible to carry out and/or complete one or more diagnostic routines. The controller may pre-calibrate which diagnostic routines may not be carried out during auxiliary device operation. As an example, an entry condition for the above mentioned oxygen sensor test includes a DFSO event which may not occur during operation of the auxiliary device due to increased torque delivery requirements. Therefore, the oxygen sensor test may not be carried out when the auxiliary device is operating.

However, if it is determined that it is possible to run a diagnostic routine during operation of the auxiliary device operation, the routine may proceed to step 312 and the controller may actuate one or more engine actuators to initiate the diagnostic routine. At 313, the routine includes determining if the ongoing diagnostic routine is being interrupted due to auxiliary device operation. As an example, a diagnostic routine may be underway when an auxiliary device operation may be initiated which may result in changes in engine operating conditions which no longer support successful completion of the diagnostic routine. If it is determined that the diagnostic routine is not interrupted or adversely affected in any way due to the operation of an auxiliary device, at 314, the drive cycle may be marked as a valid drive cycle. At the end of the drive cycle, the IUMP ratio from the end of the immediately previous drive cycle may be retrieved from controller memory and a denominator of the IUMP ratio may be incremented by one. The IUMP ratio is given by equation 1.

$$IUMP = \frac{\text{Number of completed diagnostic routines}}{\text{Number of valid drive cycle}} \quad (1)$$

At 316, after completion of the diagnostic routine, the numerator may be incremented by one. If the diagnostic routine could not be completed during the drive cycle such as if the drive cycle ends before completion of an ongoing routine, the numerator is not incremented. In this way, the IUMP ratio may account for valid drive cycles and successful completions of diagnostic routines.

If at 310, it is determined that it may not be possible to run the diagnostic routine during operation of the auxiliary device even though conditions were met for carrying out a diagnostic routine, or if at 313 it is determined that an ongoing diagnostic routine has been interrupted due to auxiliary device operation, the routine may proceed to step 318.

When it is determined that a diagnostic routine is unable to be carried out or completed and an auxiliary device is operating, at 318, a virtual engine model without auxiliary device (VEMAD) may be run in parallel to the engine controller to determine validity of a drive cycle based on which the IUMP ratio may be updated. Details of the operation of the VEMAD model and the subsequent updating of the IUMP ratio is discussed in relation to FIG. 4.

Figure 4:
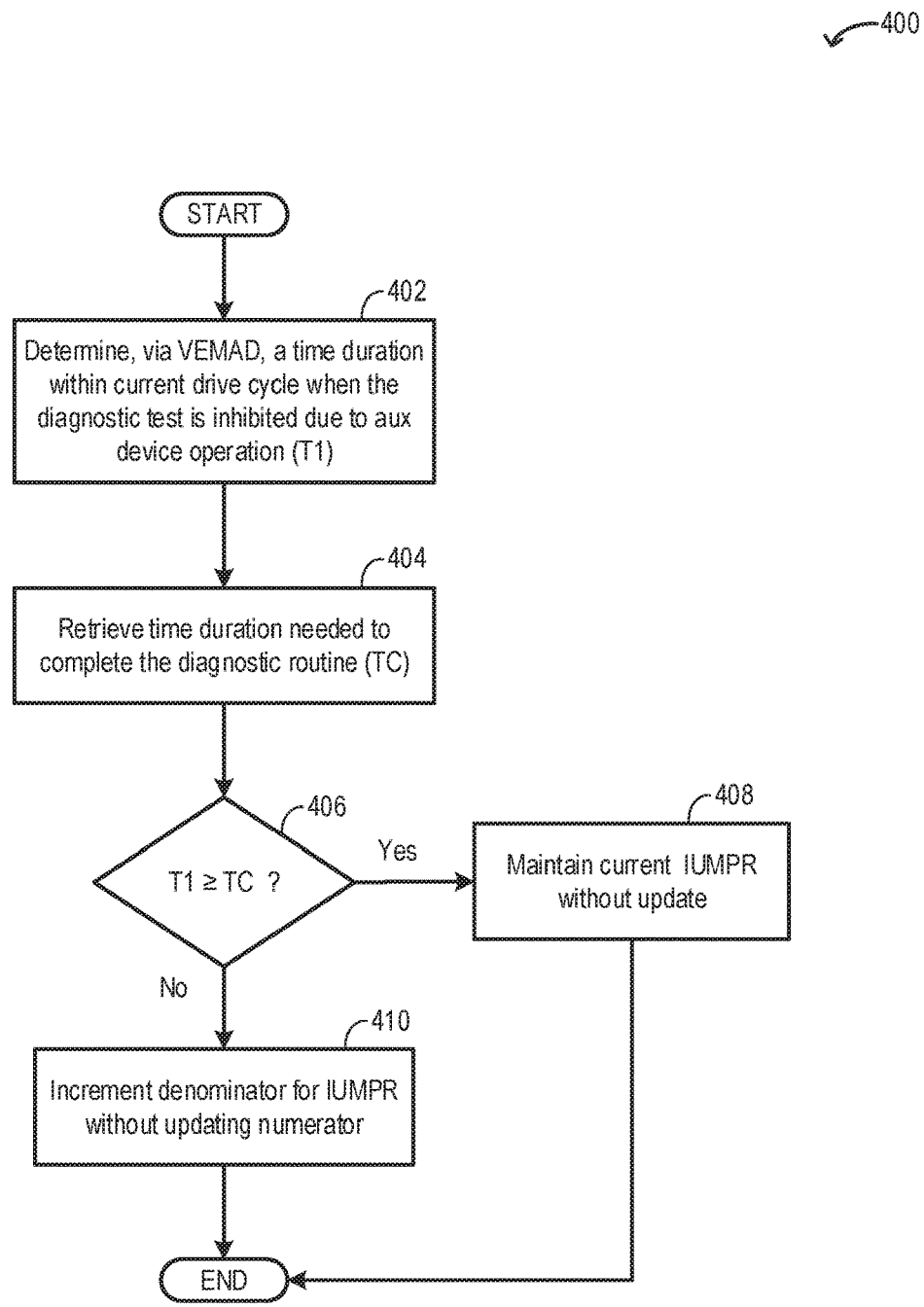
FIG. 4 shows a flow chart illustrating an example method that can be implemented to update the IUMP ratio based on a virtual engine model without auxiliary devices (VEMAD) during auxiliary device operation.

FIG. 4 shows an example method 400 for updating an in-use monitor performance (IUMP) ratio based on a virtual engine model without auxiliary devices (VEMAD) during auxiliary device operation. The method 400 may be a part of the method 300 of FIG. 3 mad may be carried out at step 318 of method 300.

At 402, the VEMAD model may be used to determine a time duration (T1) within the current drive cycle when a diagnostic test is inhibited to be performed/completed due to an operation of an auxiliary device. The VEMAD model uses a plurality of inputs including actual engine parameters, engine control inputs affected by auxiliary device operation, physical conditions that are unaffected due to auxiliary device operation and outputs a plurality of virtual engine parameters. The virtual engine parameters may include virtual engine operating conditions and engine actuator positions corresponding to a virtual condition when the engine is operating without operation of the auxiliary load (no added load of auxiliary device on engine). As an example, based on an actual driver torque demand, an actual auxiliary device torque demand, and actual engine torque output, the VEMAD model may estimate a virtual engine torque demand. During operation of the auxiliary device, the throttle opening may correspond to the current engine torque demand. If the auxiliary device was not operational (in the absence of the auxiliary device torque demand), the engine torque demand would have been lower than the current engine torque demand. Based on the virtual engine torque demand, the VEMAD may then determine a virtual throttle opening corresponding to the virtual torque demand. The virtual throttle opening may be smaller relative to the current throttle opening.

Figure 5:
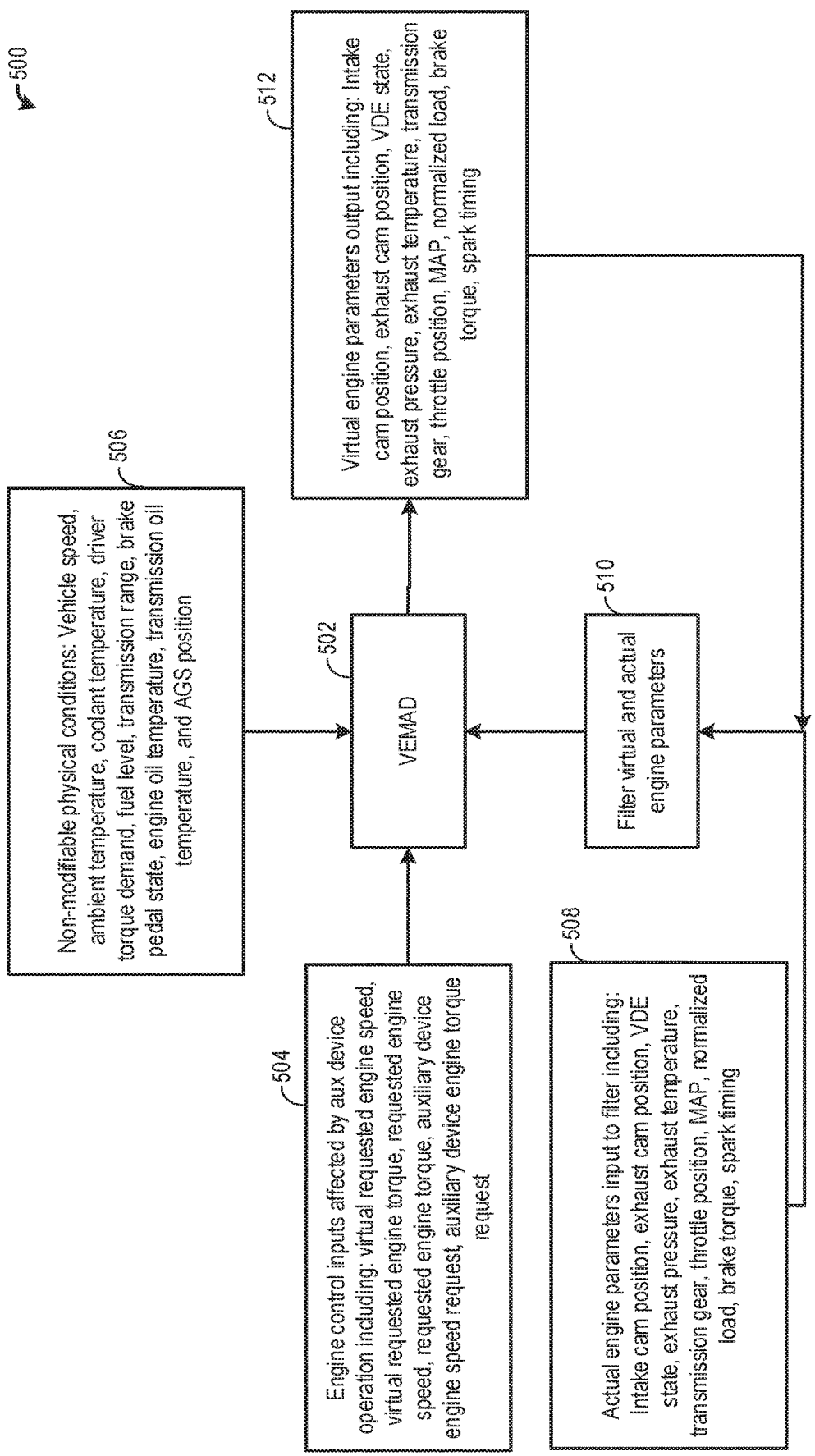
FIG. 5 shows an example of the VEMAD model.
Figure 6:
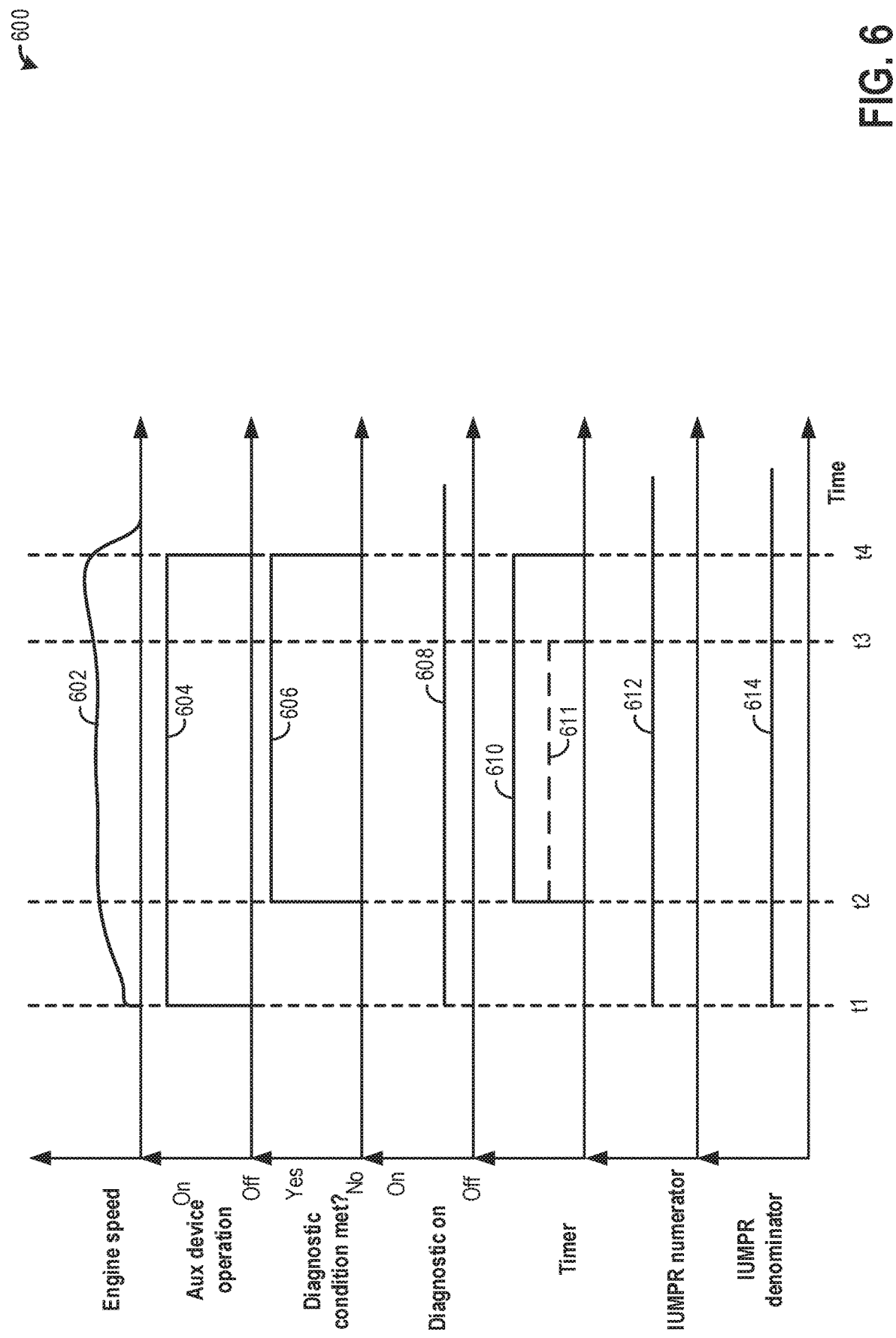
FIG. 6 shows an example IUMP ratio adjustment based on diagnostic routine completion during auxiliary device operation.

An example of the VEMAD model is shown in FIG. 5. Turning briefly to FIG. 5, block diagram 500 shows an example of the virtual engine model without auxiliary devices (VEMAD) 502. The VEMAD 502 is shown to receive a plurality of inputs. A first set of inputs may include actual engine parameters (block 508) as estimated by engine sensors discussed in FIGS. 1 and 2. The actual engine parameters may include intake cam position, exhaust cam position, variable displacement engine (VDE) state (if one or more cylinders are deactivated), exhaust pressure, exhaust temperature, transmission gear position, throttle position, manifold air pressure (MAP), normalized load, brake torque, spark timing, and other engine operating parameters. These first set of inputs may be used as an input to a filter 510 wherein the actual engine parameters may be filtered before being used as an input to the VEMAD model.

A second set of inputs may include engine control inputs affected by auxiliary device operation (block 504) as determined by the engine controller based on input from vehicle sensors. The engine control inputs may include requested engine speed (such as engine rotations per minute as measured), requested engine torque (such as desired torque the engine is requested to produce), virtual requested engine torque (such as torque that the engine would have been requested to produce if the auxiliary load was not present), virtual requested engine speed (such as engine rotations per minute that the engine would be operating at if the auxiliary device was not turned on), auxiliary device engine speed request (such as uplift in engine speed requested by the auxiliary device controller including request for an idle bump), auxiliary device engine torque request (such as torque being requested by the auxiliary device and/or used by the auxiliary device). Each of the engine control inputs may be modified due to auxiliary device operation.

A third set of inputs may include physical conditions that remain non-modifiable during operation of an auxiliary device (block 506) as estimated by engine sensors discussed in FIGS. 1 and 2. The non-modifiable physical conditions include vehicle speed, ambient temperature, coolant temperature, driver torque demand, fuel level, transmission range, brake pedal state, engine oil temperature, transmission oil temperature, and automatic gear shift position.

The VEMAD model may output a plurality of virtual engine parameters (block 512) based on the inputs received. The virtual engine parameters may also be used as an input (via filter 510) to the VEMAD model such that the virtual engine parameters do not deviate far from the actual parameters. The virtual engine parameters correspond to engine operating parameters that would have prevailed in the absence of auxiliary device operation. Said another way, had the auxiliary device not operating, the actual engine operating parameters would have been the virtual engine parameters as estimated via the VEMAD model.

The virtual engine parameters (output of VEMAD model) may include intake cam position, exhaust cam position, variable displacement engine (VDE) state (if one or more cylinders are deactivated), exhaust pressure, exhaust temperature, transmission gear position, throttle position, manifold air pressure (MAP), normalized load, brake torque, spark timing, and other engine operating parameters.

Returning to method 400 (FIG. 4), based on the virtual engine parameters, the VEMAD model may estimate if the auxiliary device is affecting engine operation in a way that the diagnostic routine is not being able to be carried out. The VEMAD model estimates a time duration (T1) in the drive cycle when the virtual engine parameters would allow the diagnostic routine to be carried out but due to the operation of the auxiliary device causing changes to engine operation, the diagnostic routine is disabled. Estimation (time accumulation) of T1 may be carried out until the end of the drive cycle. Examples of T1 may include 1 minute, 20 minutes, 2 hours, etc.

At 404, the controller may retrieve from memory, a minimum duration needed to successfully complete a diagnostic routine (TC). As an example, in order to complete a diagnostic routine, one or more engine actuators may be adjusted and data from engine sensors may be collected over a duration and then the data may be analyzed to determine the results of the diagnostic routine. In one example, the minimum duration may be a time duration. In another example, the minimum duration may be a distance of travel. The minimum duration needed to successfully complete a diagnostic routine may include a time needed to adjust the actuators, to collect sufficient data, and to analyze the data for completion of the diagnostic cycle. Examples of T2 may include 30 seconds, 2 minutes, 5 minutes, etc.

At 406, at the end of a drive cycle, the routine includes determining if a time duration (T1) in the drive cycle when the virtual engine parameters would allow the diagnostic routine to be carried out but due to the operation of the auxiliary device, the diagnostic routine is inhibited is greater than a minimum duration needed to successfully complete a diagnostic routine (TC).

If it is determined that the time duration (T1) in the drive cycle when the virtual engine parameters would allow the diagnostic routine to be carried out but due to the operation of the auxiliary device, the diagnostic routine is inhibited is greater than the minimum time duration needed to successfully complete a diagnostic routine (TC), it may be inferred that due to the operation of the auxiliary device, the diagnostic routine could not be carried out. Based on regulatory agency recommendations such drive cycles where completion of diagnostic routines is not possible solely due to auxiliary device operation, the drive cycle may be marked as an invalid drive cycle and not included in a monitor compliance evaluation. Since the drive cycle was not a valid drive cycle and the diagnostic routine was not carried out, at 408, the current IUMP ratio (as given by equation 1) may be maintained without incrementing the numerator or the denominator.

If it is determined that the time duration (T1) in the drive cycle when the virtual engine parameters would allow the diagnostic routine to be carried out but due to the operation of the auxiliary device, the diagnostic routine is inhibited is lower than the minimum time duration needed to successfully complete a diagnostic routine (TC), it may be inferred that the inhibition of the diagnostic was not solely due to operation of the auxiliary device and that the drive cycle is valid and countable towards a monitor compliance evaluation. Therefore, at 410, the denominator of the IUMP may be incremented but since the diagnostic routine was not successfully completed, the numerator may remain the same.

In this way, during operation of an auxiliary device coupled to a vehicle, during a first condition, a diagnostic routine may be carried out and each of a numerator and a denominator of an in-use monitor performance (IUMP) ratio may be updated at an end of a drive cycle, and during a second condition, an engine model may be used to estimate a time duration where the diagnostic routine is not completed due to operation of the auxiliary device, and the IUMP ratio may be selectively updated based on a comparison of the time duration to a threshold time duration for completion of the diagnostic routine at the end of the drive cycle. During the first condition, completion of the diagnostic routine is not affected by change in engine operating parameters caused due to operation of the auxiliary device, and during the second condition, the diagnostic routine is not completed while operation of the auxiliary device.

FIG. 6 shows an example operating sequence 600 illustrating an example in-use monitoring performance (IUMP) ratio adjustment based on diagnostic routine completion during auxiliary device operation. The horizontal (x-axis) denotes time and the vertical markers t1-t4 identify significant times in engine operation.

The first plot, line 602, shows a change in engine speed over time. The second plot, line 604, shows operation of an auxiliary device which is powered by engine torque. The third plot, line 606, shows time in a drive cycle when conditions are met for carrying out a diagnostic routine. The fourth plot, line 608, shows running of the diagnostic routine during the drive cycle. The fifth plot, line 610, denotes a time duration in the drive cycle, as estimated via a virtual engine model without auxiliary devices (VEMAD), when running of the diagnostic routine is disabled solely due to operation of the auxiliary device. Dashed line 611 denotes the minimum duration of time needed to complete the diagnostic routine. The sixth plot, line 612, denotes a numerator (number of completed diagnostic routines) of the IUMP ratio. The seventh plot, line 614, denotes a denominator (number of valid drive cycles) of the IUMP ratio.

Prior to time t1, the vehicle is not propelled via engine torque and the engine is not operational. An auxiliary device is not operated using engine torque and a diagnostic routine is not carried out for any engine component. At time t1, the engine is started and also operation of the auxiliary device is initiated. At time t2, it is determined that conditions are met for carrying out a diagnostic routine of an engine components however due to the operation of the auxiliary device the diagnostic routine is inhibited from running. The VEMAD model estimates a time duration (timer set at time t2) for which the diagnostic routine cannot be carried out due to the operation of the auxiliary device. As seen from dashed line 611, the time duration between time t2 and time t3 is the minimum duration for completion of the diagnostic routine. The timer from then VEMAD model continues beyond time t2 and the diagnostic routine is maintained disabled. At time t4, the engine is shut-down and the engine speed reduces to zero. The operation of the auxiliary device is discontinued and the timer is stopped. At the end of the drive cycle, based on the observation that the timer has accumulated a duration higher than the minimum duration of time needed to complete the diagnostic routine, the drive cycle is marked as an invalid drive cycle. Since the drive cycle is not a valid drive cycle and the diagnostic routine was not carried out during the drive cycle, the IUMPR numerator and the IUMPR denominator are not updated.

In this way, by using an engine model to determine if a diagnostic routine was unable to run during a drive cycle due to operation of an auxiliary device, the drive cycle may be marked as an invalid drive cycle and accuracy of IUMP ratio estimation may be improved. The technical effect of updating the denominator of the IUMP ratio when the diagnostics test could not have been carried out event if the auxiliary device was not operating is that inaccurate estimation of the denominator may be averted. Overall, by accurately updating an IUMP ratio based on operation of the auxiliary device and engine operating conditions, health monitoring of vehicle components and regulations compliance may be improved.

In one example, a method, comprises: using an engine model to estimate a duration in which a diagnostic routine is not completed due to operation of an auxiliary device driven by an engine, and in response to the duration being higher than a first threshold duration, excluding a drive cycle from a monitor compliance evaluation. In the preceding example method, additionally or optionally, entry conditions for use of the engine model include each of an operation of the auxiliary device and the diagnostic routine not being completed during the drive cycle. In any or all of the preceding examples, additionally or optionally, the monitor compliance evaluation includes updating an in-use monitor performance (IUMP) ratio at an end of the drive cycle, the method further comprising not updating a numerator and a denominator of the IUMP ratio at the end of the drive cycle when the diagnostic routine is not completed and the drive cycle is excluded from the monitor compliance evaluation, the IUMP ratio defined as a ratio of a number of completed diagnostic routines and a number of valid drive cycles. In any or all of the preceding examples, additionally or optionally, the valid drive cycle includes each of a vehicle operation for over a second threshold duration, a vehicle operation at over a threshold speed for over a third threshold duration, and a continuous engine idling for over a fourth threshold duration. In any or all of the preceding examples, the method further comprising, additionally or optionally, in response to the duration in which the diagnostic routine is not completed due to operation of the auxiliary device being lower than the first threshold duration, incrementing the denominator of the IUMP ratio by one. In any or all of the preceding examples, the method further comprising, additionally or optionally, during operation of the auxiliary device, in response to a completion of the diagnostic routine, incrementing each of the numerator and the denominator of the IUMP ratio by one. In any or all of the preceding examples, additionally or optionally, the duration in which the diagnostic routine is not completed due to operation of the auxiliary device includes a duration of time, and wherein the first threshold duration is a minimum duration of time for completion of the diagnostic routine. In any or all of the preceding examples, additionally or optionally, during operation of the auxiliary device, the engine model estimates one or more virtual engine operating parameters corresponding to a hypothetical situation in the drive cycle without the operation of the auxiliary device. In any or all of the preceding examples, additionally or optionally, the one or more virtual engine operating parameters include a virtual throttle position, a virtual manifold air pressure, a virtual engine load, a virtual exhaust pressure, a virtual exhaust temperature, a virtual intake camshaft position, a virtual exhaust camshaft position, a virtual number of active engine cylinders, a virtual engine brake torque, and a virtual spark timing. In any or all of the preceding examples, additionally or optionally, inputs to the engine model includes the one or more virtual engine operating parameters and one or more current engine operating conditions altered during operation of the auxiliary device, the current engine operating conditions include a throttle position, a manifold air pressure, an engine load, an exhaust pressure, an exhaust temperature, an intake camshaft position, an exhaust camshaft position, a number of active engine cylinders, an engine brake torque, and a spark timing. In any or all of the preceding examples, additionally or optionally, the virtual engine operating parameters and the current engine operating conditions are filtered prior to being used as input to the engine model. In any or all of the preceding examples, additionally or optionally, the inputs to the engine model further includes one or more of auxiliary device requested engine torque and auxiliary device requested engine speed. In any or all of the preceding examples, additionally or optionally, the inputs to the engine model further includes one or more vehicle conditions not affected by the operation of the auxiliary device, the one or more vehicle conditions including a vehicle speed, an ambient temperature, a coolant temperature, a driver torque demand, a fuel level, a transmission range, a brake pedal state, an engine oil temperature, a transmission oil temperature, and an automatic gear shift position. In any or all of the preceding examples, additionally or optionally, the diagnostic routine includes an oxygen sensor test.

Another example method comprises: during operation of an auxiliary device coupled to a vehicle, during a first condition, carrying out a diagnostic routine and updating each of a numerator and a denominator of an in-use monitor performance (IUMP) ratio at an end of a drive cycle; and during a second condition, using an engine model to estimate a time duration where the diagnostic routine is not completed due to operation of the auxiliary device, and selectively updating the IUMP ratio based on a comparison of the time duration to a threshold time duration for completion of the diagnostic routine at the end of the drive cycle. In the preceding example method, additionally or optionally, during the first condition, completion of the diagnostic routine is not affected by change in engine operating parameters caused due to operation of the auxiliary device, and during the second condition, the diagnostic routine is not completed while operation of the auxiliary device. In any or all of the preceding examples, additionally or optionally, selectively updating includes, in response to the time duration being lower than the threshold duration, incrementing the denominator of the IUMP ratio without altering the numerator of the IUMP ratio, and in response to the time duration being higher than the threshold duration, not incrementing the denominator of the IUMP ratio and the numerator of the IUMP ratio. In any or all of the preceding examples, additionally or optionally, the engine model uses one or more engine operating parameters altered due to operation of the auxiliary device, torque demand of the auxiliary device, and one or more vehicle conditions not altered due to operation of the auxiliary device as inputs, and wherein the engine model outputs the time duration where the diagnostic routine is not completed due to operation of the auxiliary device.

In yet another example, a system for a vehicle, comprises: a controller with computer readable instructions stored on non-transitory memory that when executed enable the controller to: during a drive cycle when an external auxiliary device is powered by operation of an engine, in response to a diagnostic routine not being completed, estimate, via an engine model, a time duration where the diagnostic routine is not completed due to operation of the auxiliary device, compare the time duration to a minimum duration for completion of the diagnostic routine, in response to the time duration being higher than the minimum duration, at an end of the drive cycle, not update an in-use monitor performance (IUMP) ratio, and in response to the time duration being lower than the minimum duration, at the end of the drive cycle, increase a denominator of the IUMP ratio without altering the numerator of the IUMP ratio. In the preceding example system, additionally or optionally, the IUMP ratio is a ratio between a number of completed diagnostic routines and a number of valid drive cycles, a valid drive cycle includes each of vehicle operation for over a first threshold duration, vehicle operation at over a threshold speed for over a second threshold duration, and a continuous engine idling for over a third threshold duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
 a controller with computer readable instructions stored on non-transitory memory that when executed enable the controller to:
  use an engine model to estimate a duration in which a diagnostic routine is not completed due to operation of an auxiliary device driven by an engine of the vehicle, and
  in response to the duration being higher than a first threshold duration, exclude a drive cycle from a monitor compliance evaluation.

2. The system of claim 1, wherein entry conditions for use of the engine model include each of an operation of the auxiliary device and the diagnostic routine not being completed during the drive cycle.

3. The system of claim 1, wherein the monitor compliance evaluation includes updating an in-use monitor performance (IUMP) ratio at an end of the drive cycle, and the controller includes further computer readable instructions stored on the non-transitory memory that, when executed, enable the controller to:
 not update a numerator and a denominator of the IUMP ratio at the end of the drive cycle when the diagnostic routine is not completed and the drive cycle is excluded from the monitor compliance evaluation, the IUMP ratio defined as a ratio of a number of completed diagnostic routines and a number of valid drive cycles.

4. The system of claim 3, wherein the valid drive cycle includes each of a vehicle operation for over a second threshold duration, the vehicle operation at over a threshold speed for over a third threshold duration, and a continuous engine idling for over a fourth threshold duration.

5. The system of claim 3, wherein the controller includes further computer readable instructions stored on the non-transitory memory that, when executed, enable the controller to:
 in response to the duration in which the diagnostic routine is not completed due to operation of the auxiliary device being lower than the first threshold duration, increment the denominator of the IUMP ratio by one.

6. The system of claim 3, wherein the controller includes further computer readable instructions stored on the non-transitory memory that, when executed, enable the controller to:
 during operation of the auxiliary device, in response to a completion of the diagnostic routine, increment each of the numerator and the denominator of the IUMP ratio by one.

7. The system of claim 1, wherein the duration in which the diagnostic routine is not completed due to operation of the auxiliary device includes a duration of time, and wherein the first threshold duration is a minimum duration of time for completion of the diagnostic routine.

8. The system of claim 1, wherein, during operation of the auxiliary device, the engine model estimates one or more virtual engine operating parameters corresponding to a hypothetical situation in the drive cycle without the operation of the auxiliary device.

9. The system of claim 8, wherein the one or more virtual engine operating parameters include a virtual throttle position, a virtual manifold air pressure, a virtual engine load, a virtual exhaust pressure, a virtual exhaust temperature, a virtual intake camshaft position, a virtual exhaust camshaft position, a virtual number of active engine cylinders, a virtual engine brake torque, and a virtual spark timing.

10. The system of claim 8, wherein inputs to the engine model include the one or more virtual engine operating parameters and one or more current engine operating conditions altered during operation of the auxiliary device, the current engine operating conditions include a throttle position, a manifold air pressure, an engine load, an exhaust pressure, an exhaust temperature, an intake camshaft position, an exhaust camshaft position, a number of active engine cylinders, an engine brake torque, and a spark timing.

11. The system of claim 10, wherein the virtual engine operating parameters and the current engine operating conditions are filtered prior to being used as the inputs to the engine model.

12. The system of claim 10, wherein the inputs to the engine model further include one or more of auxiliary device requested engine torque and auxiliary device requested engine speed.

13. The system of claim 10, wherein the inputs to the engine model further include one or more vehicle conditions not affected by the operation of the auxiliary device, the one or more vehicle conditions including a vehicle speed, an ambient temperature, a coolant temperature, a driver torque demand, a fuel level, a transmission range, a brake pedal state, an engine oil temperature, a transmission oil temperature, and an automatic gear shift position.

14. The system of claim 1, wherein the diagnostic routine includes an oxygen sensor test.

15. A system, comprising:
a controller with computer readable instructions stored on non-transitory memory that when executed enable the controller to:
during operation of an auxiliary device coupled to a vehicle,
during a first condition, carry out a diagnostic routine and update each of a numerator and a denominator of an in-use monitor performance (IUMP) ratio at an end of a drive cycle; and
during a second condition, use an engine model to estimate a time duration where the diagnostic routine is not completed due to operation of the auxiliary device, and selectively update the IUMP ratio based on a comparison of the time duration to a threshold time duration for completion of the diagnostic routine at the end of the drive cycle.

16. The system of claim 15, wherein during the first condition, completion of the diagnostic routine is not affected by change in engine operating parameters caused due to operation of the auxiliary device, and during the second condition, the diagnostic routine is not completed while operation of the auxiliary device.

17. The system of claim 15, wherein to selectively update the IUMP ratio, the controller includes further computer readable instructions on the non-transitory memory that, when executed, enable the controller to:

in response to the time duration being lower than the threshold duration, increment the denominator of the IUMP ratio without altering the numerator of the IUMP ratio; and
in response to the time duration being higher than the threshold duration, not increment the denominator of the IUMP ratio and the numerator of the IUMP ratio.

18. The system of claim 15, wherein the engine model uses one or more engine operating parameters altered due to operation of the auxiliary device, torque demand of the auxiliary device, and one or more vehicle conditions not altered due to operation of the auxiliary device as inputs, and wherein the engine model outputs the time duration where the diagnostic routine is not completed due to operation of the auxiliary device.

19. A system for a vehicle, comprising:
a controller with computer readable instructions stored on non-transitory memory that when executed enable the controller to:
during a drive cycle when an external auxiliary device is powered by operation of an engine,
in response to a diagnostic routine not being completed,
estimate, via an engine model, a time duration where the diagnostic routine is not completed due to operation of the auxiliary device;
compare the time duration to a minimum duration for completion of the diagnostic routine,
in response to the time duration being higher than the minimum duration, at an end of the drive cycle, not update an in-use monitor performance (IUMP) ratio, and
in response to the time duration being lower than the minimum duration, at the end of the drive cycle, increase a denominator of the IUMP ratio without altering the numerator of the IUMP ratio.

20. The system of claim 19, wherein the IUMP ratio is a ratio between a number of completed diagnostic routines and a number of valid drive cycles, a valid drive cycle includes each of vehicle operation for over a first threshold duration, vehicle operation at over a threshold speed for over a second threshold duration, and a continuous engine idling for over a third threshold duration.

* * * * *